Figure 1:
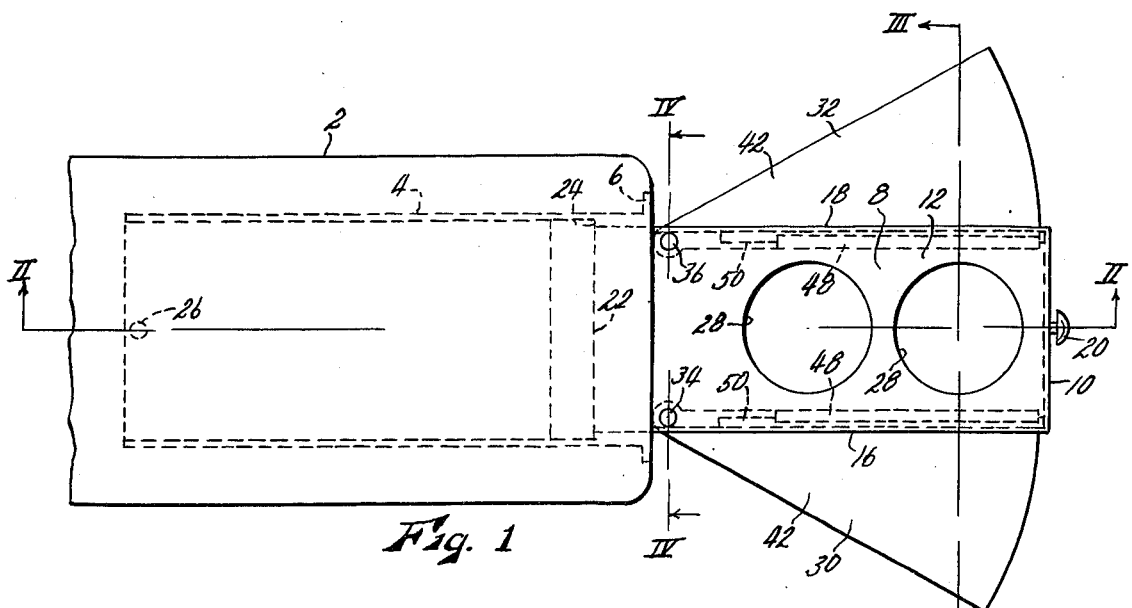

United States Patent [19]

Arnold

[11] 4,040,659
[45] Aug. 9, 1977

[54] FOOD TRAY FOR AUTOMOBILES

[76] Inventor: Addie M. Arnold, Box 2603, Kansas City, Mo. 64142

[21] Appl. No.: 691,233

[22] Filed: June 1, 1976

[51] Int. Cl.² .............................................. A47C 7/62
[52] U.S. Cl. ................................................... 297/194
[58] Field of Search ............... 297/194, 188, 113, 411; 211/132; 248/279, 298; 108/28; 312/282, 235 A

[56] References Cited

U.S. PATENT DOCUMENTS

| 1,802,620 | 4/1931 | Scully | 297/113 |
| 1,939,849 | 12/1933 | Herder | 312/287 X |
| 2,163,349 | 6/1939 | Olsen | 297/194 X |
| 2,719,066 | 9/1955 | Budzinski | 108/45 X |
| 3,103,630 | 9/1963 | Pitts et al. | 297/113 X |
| 3,215,467 | 11/1965 | McFarland et al. | 297/194 |
| 3,637,184 | 1/1972 | O'Brien | 297/194 |
| 3,951,448 | 4/1976 | Hawie | 297/194 |

Primary Examiner—James T. McCall
Attorney, Agent, or Firm—John A. Hamilton

[57] ABSTRACT

A food tray for automobiles adapted to be built into the center arm rest of the front seat of an automobile, normally entirely enclosed within the arm rest, comprising a tubular arm normally enclosed within the arm rest but being slidable forwardly therein to provide a forward extension thereof, and auxiliary tray members normally enclosed within the arm but being laterally extendable therefrom when the arm is in its forwardly extended position.

3 Claims, 4 Drawing Figures

FOOD TRAY FOR AUTOMOBILES

This invention relates to new and useful improvements in automobile accessories, and has particular reference to a food tray adapted to be permanently mounted in an automobile.

The practice of eating in automobiles has become extremely common and widespread, in view of the virtually universal popularity of drive-in restaurants. However, the problem of suitable tray area to support sandwiches, soft drinks, and other food and food containers remains, so far as is within my knowledge, without satisfactory solution. The usual practice of drive-in restaurants of detachably connecting a tray to the exterior of the vehicle, accessible only through an open window of the vehicle, is not satisfactory in inclement weather, both since the tray contents are not protected against rain, cold, and the like, and also since the vehicle occupants are deprived of protection if the window must remain open. Mounting such a tray inside of the vehicle is sometimes possible, but the tray then obstructs an inconveniently large proportion of the vehicle seating area.

The object of the present invention, accordingly, is the provision of an automobile food tray which may be permanently installed in an automobile, which is completely enclosed and inconspicuous when not in use, and which when in position for use does not obstruct or prevent normal usage of any of the seating area of the vehicle. Generally, this is accomplished by enclosing the tray device completely within the center arm rest of the front seat of an automobile, many automobiles being equipped with such arm rest, and being extendable when use thereof is desired forwardly from said arm rest to provide a forward extension, and also laterally from said forward extension to increase the usable width thereof.

Other objects are simplicity and economy of construction, efficiency and dependability of operation, and adaptability for use either as original equipment or as an add-on accessory.

Figure 2:
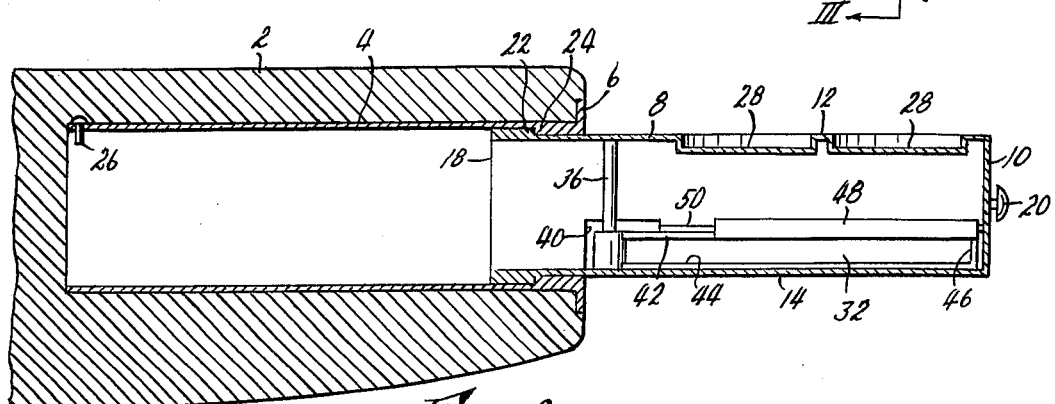
Figure 3:
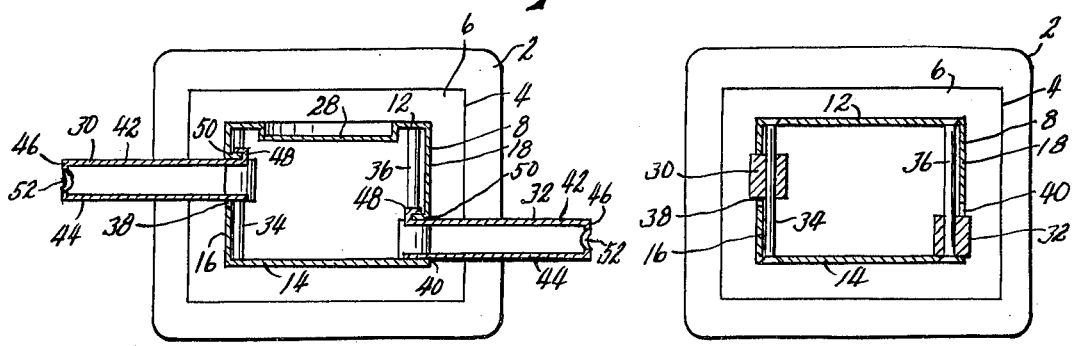
Figure 4:
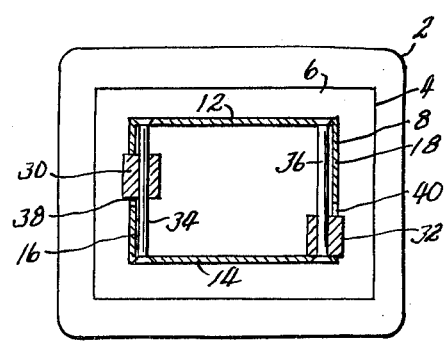

With these objects in view, as well as other objects which will appear in the course of the specification, reference will be had to the accompanying drawing, wherein:

FIG. 1 is a fragmentary top plan view of the center arm rest of an automobile, showing a food tray embodying the present invention operatively mounted therein and extended for use, FIG. 2 is a sectional view taken on line II—II of FIG. 1, FIG. 3 is a sectional view taken on line III—III of FIG. 1, and, FIG. 4 is a sectional view taken on line IV—IV of FIG. 1.

Like reference numerals apply to similar parts throughout the several views, and the numeral 2 applies to the central arm rest of an automobile. Said arm rest is most commonly disposed at the center of the front seat of the automobile, extending forwardly from the seat back above the level of the actual seating surface. It may be pivoted to the back structure on a horizontal transverse axis, so as to be pivotable upwardly and rearwardly into an interruption of or recess in the back cushion, in order to permit sitting on the entire width of the seat, with no interruption by the arm rest, but this is not pertinent to the present invention. The present food tray may be mounted in the arm rest regardless of whether said arm rest is fixed or movable.

In accordance with the present invention, a tray mounting tube 4 is mounted longitudinally in the arm rest. Said tube is fixedly mounted in the arm rest by any suitable means, not shown, and is completely encased therein to such a depth from its external surfaces that said surfaces may be padded if desired, except that it opens through the forward end of the arm rest, being provided at its forward end with an external flange 6 which may be secured in flush relation to the forward end of said arm rest. Said tube may also be open at its rearward end, as shown, for ease of assembly of the parts, as will appear, and is preferably of rectangular cross-sectional contour.

Mounted coaxially and slidably in tube 4 is a hollow extension arm 8, also of rectangular cross-sectional contour. It is closed at its forward end by wall 10, and also has a top wall 12, bottom wall 14, and side walls 16 and 18. It may be pulled forwardly to extend forwardly of the arm rest, as shown, by a pull handle 20 fixed to end wall 10, its forward extension being limited by the abutment of a forwardly facing shoulder 22 thereof with a rearwardly facing shoulder 24 formed internally in tube 4. The arm may be moved rearwardly in tube 4 to a position at which its front end wall 10 is flush with tube flange 6, whereupon its movement is arrested by a pin 26 fixed in the wall of tube 4 adjacent its rearward end. Said pin may be inserted after arm 8 is assembled in sleeve 4 by forward insertion thereof, before the sleeve is inserted into the arm rest. Top wall 12 of arm 8 is of course exposed when the arm is extended forwardly as shown, and thus forms a usable tray surface. Circular depressions 28 are formed in said top wall for convenience in supporting coffee and soft drink cups or the like thereon.

Normally enclosed within arm 8 are a pair of extension tray leaves 30 and 32. Each of said leaves is horizontally essentially planar, being generally triangular or in the form of a sector of a circle with its broader end extending forwardly, and its apex rearwardly. the rearward apeces thereof are each pivoted on a vertical pin fixed in the arm, the pivot pins 34 and 36 of the respective leaves 30 and 32 being disposed adjacent respectively opposite lateral sides of the arm, in such a position that they are moved just forwardly of the forward end of the arm rest 2 when arm 8 is fully extended, as shown. The leaves are disposed in relatively over — and — under relation within arm 8, leaf 30 being the upper of the two and being pivotal outwardly from the arm to the right, as shown, through a slot 38 formed in right side wall 16 of the arm, and leaf 32 being the lower of the two and being pivotal outwardly from the arm to the left, through a slot 40 formed in left side wall 18 of the arm. The parts then have the general appearance best shown in FIG. 1, the upper surfaces of leaves 30 and 32 forming lateral extensions of top arm surface 12, these extensions of course being usable as trays to support sandwiches, or other food, or nearly anything else. For strength, tray leaves 30 and 32 are preferably formed in double-wall construction, each having a top wall 42, a bottom wall 44, and a vertical edge wall 46 along its outer and forward edges, as best shown in FIG. 3. The top wall 42 of each leaf is provided along its inner edge, said edge being substantially radial to the pivot pin 34 or 36 of that leaf, with an upwardly and then outwardly turned edge portion 48, forming an outwardly opening channel which, when the leaf is fully extended as shown, engages over an inturned lip 50 of the adjacent side wall 16 or 18 of arm 8, said lips being disposed at the upper edges of the leaf slots 38 and 40 of said side walls. This engagement of channels 48 over lips 50 of course limits the outward extension of the tray leaves, and also provides additional support strength for said leaves. To assist in extending the leaves, finger holes 52 may be provided in the outer vertical edge walls 46 of said leaves.

The operation of the device is believed to be self-evident from the foregoing description of its construction, and it is apparent that it possesses several novel advantages. It is normally completely enclosed within arm rest 2, so as to be neatly concealed and form no obstruction to normal usage of the available space of the vehicle interior. The arm rest itself is often pivotal into a space provided in the back rest of the automobile seat, although this in itself is not part of the present invention. It is extended for use by grasping handle 20 and pulling arm 8 slidably forwardly in tube 4 until shoulders 22 and 24 of said arm and tube abut, then inserting a finger into finger holes 52 of leaves 30 and 32 to pivot said leaves laterally outwardly from said arm to the position shown in FIG. 1. There is thus provided a food tray area of substantial extent, conveniently disposed to passengers of the automobile seated at the respectively opposite sides of the arm rest. Nevertheless, even in this extended position, it does not occupy nor obstruct any seating area or any other space normally occupied by the passengers. In the proportions shown, there will be ample space between the dashboard and the forward end of arm rest 2 to accomodate the food tray. The tray may be retracted into tube 4 simply by reversing the extension procedure just described, or even more simply, by merely pushing arm 8 slidably rearwardly in the tube. In the latter case, the side edges of the tube engage the forwardly divergent outer edges of tray leaves 30 and 32, and cam them pivotally to their retracted positions within the arm.

While I have shown and described a specific embodiment of my invention, it will be readily apparent that many minor changes of structure and operation could be made without departing from the spirit of the invention.

What I claim as new and desire to protect by Letters Patent is :

1. A food tray for automobiles comprising:
   a. a hollow, elongated tubular arm,
   b. mounting means operable to support said arm for longitudinal sliding movement horizontally in the arm rest of an automobile, whereby said arm may be extended forwardly from the forward end of said arm rest, and
   c. a pair of tray leaves normally enclosed in said hollow arm, said leaves being substantially horizontal, each having a transverse width substantially equal to the transverse width of said arm, and being disposed in over-and-under relation when enclosed in said arm, each of said tray leaves being pivotally mounted within said hollow arm on a vertical axis, whereby to be laterally extensible from said arm in a horizontal direction.

2. A food tray as recited in claim 1 wherein each of said tray leaves has a horizontal configuration corresponding to a sector of a circle, with their apeces extending rearwardly and being pivoted to said arm on axes disposed respectively at laterally opposite edges of said arm, whereby when said leaves are extended their distal edges are disposed in forwardly divergent relation, and whereby as said hollow arm is moved rearwardly into said arm rest, said arm rest will slidably engage said divergent tray leaf edges to cam said leaves to their retracted positions within said arm.

3. A food tray as recited in claim 2 with the addition of cooperative horizontally engaging support members carried respectively by said hollow arm and each of said tray leaves so as to be engaged when said leaves are extended, and operable when engaged to support said tray leaves vertically relative to said arm, at points spaced forwardly from the pivotal axes of said leaves.

* * * * *